United States Patent Office 3,746,768
Patented July 17, 1973

3,746,768
SUBSTITUTED PHENYL ETHERS AND THIO-
ETHERS AS INSECT REPELLENTS
Carl Bordenca, Ponte Vedra Beach, and Kenneth P.
Dorschner and Robert P. Johnson, Jacksonville, Fla.,
assignors to SCM Corporation, Cleveland, Ohio
No Drawing. Filed Oct. 2, 1970, Ser. No. 77,702
Int. Cl. A01n 9/22, 9/24
U.S. Cl. 424—330                    7 Claims

ABSTRACT OF THE DISCLOSURE

Novel compositions comprising:
(a) An amount effective for repelling insects of a compound of the formula:

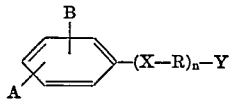

where A is ethylenically unsaturated hydrocarbon containing from 3 to 5 carbon atoms,
X is sulfur or oxygen,
R is lower alkylene containing from 1 to 6 carbon atoms,
B is lower alkyl thio or alkoxy containing from 1 to 4 carbon atoms,
Y is selected from the group consisting of N-heterocyclic and

where R' and R" are hydrogen or like or dissimilar saturated or unsaturated lower alkyl,
n is an integer of from 1 to 3, and stable salts thereof; and
(b) An inert carrier therefor, are described. The invention is advantageous in that the compositions exhibit repellent properties for prolonged periods of time toward a wide spectrum of insects.

BACKGROUND OF THE INVENTION

This invention pertains to novel compositions and more particularly to novel compositions containing dialkyl-amino or N-heterocyclic-amino ethers and thioethers which are effective insect repellents.

The invention is advantageous in that areas treated with the compositions of this invention remain substantially free of insects for prolonged periods of time, for example up to 4 to 6 times longer than when conventional insect repellent compositions are employed.

The closest prior art known to applicant is: "Allylphenol and Propenylphenol Derivatives," H. Olga Hankovszky, K. Hideg, and G. Mehes, Acta Chim. Acad. Sci, Hung, 47:2, 199–209 (1966); Chem. Abstr., 64, 19608d (1966).

The active chemical components of these compositions are prepared by known methods. Representative chemical syntheses of compounds falling within the scope of the compositions of this invention are included, for example, in: S. Kuroda and S. Koyama, J. Pharm. Soc. Japan, 63, 387–9, 529–32 (1943); Chem. Abstr. 45, 3350d, 3351a (1951); and T. Takahashi and S. Senda, Acta Schol. Med. Univ. Kioto, 27, 34–42 (1949); Chem. Abstr. 46, 455 (1952).

SUMMARY OF THE INVENTION

The present invention relates to a novel class of insect repellent or insectifugal compositions. The term "insectifugal compositions" as used herein is intended to mean and to refer to compositions which effectively repel insects.

Compositions falling within the scope of this invention are effective in repelling a wide spectrum of insects, including flying and crawling insects, such as, for example, cockroaches, moths, houseflies, stable flies, mites, flour beetles, bean beetles, fleas, chiggers, ants, and the like. The compositions of this invention have been found to be particularly effective in repelling cockroaches, stable flies, and flour beetles.

The invention provides novel compositions comprising:
(a) An amount effective for repelling insects of a compound of the formula:

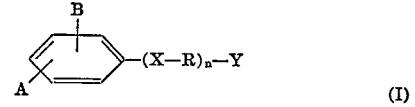

where A is ethylenically unsaturated hydrocarbon containing from 3 to 5 carbon atoms,
X is sulfur or oxygen,
R is lower alkylene containing from 1 to 6 carbon atoms,
B is lower alkyl thio or alkoxy containing from 1 to 4 carbon atoms,
Y is selected from the group consisting of N-heterocyclic and

where R' and R" are hydrogen or like or dissimilar saturated or unsaturated lower alkyl,
n is an integer of from 1 to 3, and stable salts thereof; and
(b) An inert carrier therefor.

Compositions falling within the scope of Formula I, when used to contact an insect environment, effectively repel the insects for prolonged periods of time, for example, up to three weeks or more. The term "insect environment as used herein is intended to mean and to include areas or surfaces which are infested with insects or which are susceptible to insect infestation, for example, food storage areas, drains, including containers, and areas having growing vegetation.

DESCRIPTION OF ADVANTAGEOUS EMBODIMENTS

Compounds falling within the scope of Formula I usually have limited water solubility but are generally soluble or dispersible in conventional liquids, solids, or semi-solids employed in insectifugal formulations. The compounds are usually liquids, have the general properties of oils and boil between about 100° C. and 200° C., the boiling points being measured at 1 mm. of mercury.

The compositions of this invention are relatively non-toxic to warm-blooded animals and man in concentrations or amounts above those which are insectifugally effective.

In compounds falling within the scope of Formula I, Y represents a diakyl amino group or a saturated or unsaturated heterocyclic group containing at least one nitrogen atom. Saturated heterocyclic groups represented by Y include ethylenimino, azetidino, pyrrolidino, piperidino, piperazino, and morpholino. Unsaturated heterocyclic groups represented by Y include pyrrollo, pyrrolino, pyrazollo, and imidazollo. The N-heterocyclic groups or radicals which form one distinct portion of the structure of the compounds falling within the scope of Formula I are discussed in an American Chemical Society Monograph entitled, "Industrial Organic Nitrogen Compounds," by Melvin J. Astle, pp. 115–179, published by Reinhold Publishing Corporation, New York, 1961. Particularly advantageous compounds are those which contain saturated heterocyclic groups selected from the class consisting of pyrrolidino, piperidino, and morpholino.

In compounds covered by Formula I, Y can represent the dialkyl amino group

where R' and R" can represent methyl, ethyl, ethylene, propyl, 2-propyl, propylene, n-butyl, 1-butylene, secondary butyl, 2-butylene, tertiary butyl, and isobutylene groups in addition to hydrogen.

In compounds falling within the scope of Formula I, B represents a lower alkyl thio or alkoxy group containing from 1 to 4 carbon atoms (e.g. methoxy, methyl thio, ethoxy, ethyl thio, propoxy, propyl thio, butoxy, and butyl thio) and is preferably methoxy or ethoxy for economic reasons.

Unsaturated hydrocarbons represented by A that fall within the scope of Formula I can contain from 3 to 5 carbon atoms (e.g. propenyl, butenyl, and pentenyl). Unsaturated hydrocarbons represented by A which have ethylenic linkage at the alpha or beta carbon atoms have been found to possess an advantageous degree of insect repellent activity (e.g. 1-propenyl, allyl, 1-butenyl, 2-butenyl, 1-pentenyl, and 2-pentenyl).

In compounds covered by Formula I, R represents a lower alkylene containing 1 to 6 carbon atoms (e.g. methlyene, ethylene, propylene, butylene, pentylene, or hexylene). When R represents 3 carbon atoms, R can be n-propylene, and 2-propylene. When R represents 4 carbon atoms, R can be butylene, iso-butylene, and all position isomers. When R represents 5 carbon atoms, R can be pentylene, 1,2-pentylene, 1,3-pentylene and neopentylene. When R represents 6 carbon atoms, R can be hexylene, 1,2-hexylene, 1,3-hexylene and position isomers, R is preferably ethylene or propylene for economic reasons. Where $n$ is greater than 1, R can represent like or dissimilar lower alkylenes.

An advantageous class of compounds falling within the scope of Formula I which has been found to possess a high degree of insect repellent activity is represented by the formula:

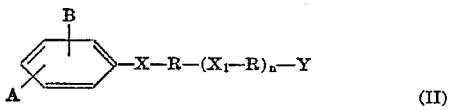

(II)

where A, B, X, R, and Y are as hereinbefore described, $X_1$ is sulfur or oxygen,
$n$ is an integer of 1 or 2, and
at least one of X and $X_1$ is oxygen.

Subclasses of insectifugally advantageous compounds falling within the scope of Formula II include compounds of the formulae:

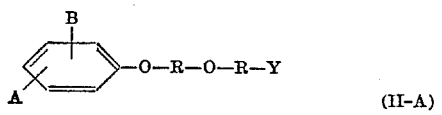

(II-A)

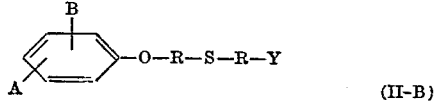

(II-B)

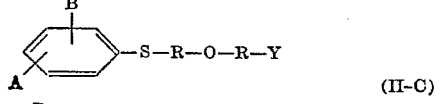

(II-C)

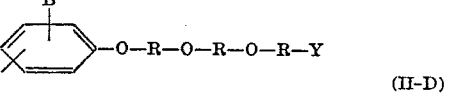

(II-D)

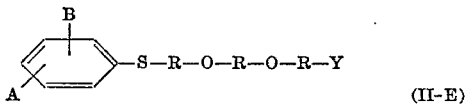

(II-E)

where in the Formulae II-A, II-B, II-C, II-D, II-E, A, B, R, and Y are as hereinbefore described.

In compounds falling within the scope of the foregoing formulae, R is a lower alkylene group which can contain from 1 to 6 carbon atoms, but preferably contains from 2 to 4 carbon atoms for economic reasons. Although R is preferably ethylene, 1,3-propylene, or 1,4-butylene, particularly advantageous and economical compounds are those wherein R represents ethylene or 1,3-propylene.

Another advantageous subclass of compounds falling within the scope of the Formula I includes compounds of the Formula:

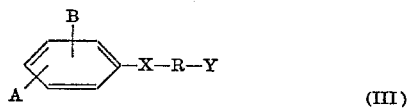

(III)

where A, B, X, R, and Y are as hereinbefore described.

Compositions containing specific compounds falling within the scope of Formulae II, II-A through II-E, and III, which have been found to have an especially high degree of insect repellent activity include, for example the following compounds;

4-(1-propenyl)-2-methoxyphenyl diethylaminoethyl ether
2-(1-propenyl)-4-methoxyphenyl diethylaminoethyl ether
5-(1-propenyl)-2-methoxyphenyl diethylaminoethyl ether
4-(1-propenyl)-2-methoxyphenyl diethylaminoethyl thioether
2-(1-propenyl)-4-methoxyphenyl diethylaminoethyl thioether
5-(1-propenyl)-2-methoxyphenyl diethylaminoethyl thioether
4-(1-propenyl)-2-methoxyphenyl dimethylaminoethyl thioether
2-(1-propenyl)-4-methoxyphenyl dimethylaminoethyl thioether
5-(1-propenyl)-2-methoxyphenyl dimethylaminoethyl thioether
4-(1-propenyl)-2-methoxyphenyl dimethylaminoethyl ether
2-(1-propenyl)-4-methoxyphenyl dimethylaminoethyl ether
5-(1-propenyl)-2-methoxyphenyl dimethylaminoethyl ether
4-(1-propenyl)-2-methoxyphenyl dipropylaminoethyl ether
2-(1-propenyl)-4-methoxyphenyl dipropylaminoethyl ether
5-(1-propenyl)-2-methoxyphenyl dipropylaminoethyl ether
4-(1-propenyl)-2-methoxyphenyl dipropylaminoethyl thioether
2-(1-propenyl)-4-methoxyphenyl dipropylaminoethyl thioether
5-(1-propenyl)-2-methoxyphenyl dipropylaminoethyl thioether
4-(1-propenyl)-2-methoxyphenyl diisopropylaminoethyl thioether
2-(1-propenyl)-4-methoxyphenyl diisopropylaminoethyl thioether
5-(1-propenyl)-2-methoxyphenyl diisopropylaminoethyl thioether
4-(1-propenyl)-2-methoxyphenyl diisopropylaminoethyl ether
2-(1-propenyl)-4-methoxyphenyl diisopropylaminoethyl ether
5-(1-propenyl)-2-methoxyphenyl diisopropylaminoethyl ether
4-(1-propenyl)-2-methoxyphenyl dibutylaminoethyl ether 2-(1-propenyl)-4-methoxyphenyl dibutylaminoethyl ether
5-(1-propenyl)-2-methoxyphenyl dibutylaminoethyl ether
4-(1-propenyl)-2-methoxyphenyl dibutylaminoethyl thioether
2-(1-propenyl)-4-methoxyphenyl dibutylaminoethyl thioether
5-(1-propenyl)-2-methoxyphenyl dibutylaminoethyl thioether
4-allyl-2-methoxyphenyl diethylaminoethyl thioether
2-allyl-4-methoxyphenyl diethylaminoethyl thioether
5-allyl-2-methoxyphenyl diethylaminoethyl thioether
4-allyl-2-methoxyphenyl diethylaminoethyl ether
2-allyl-4-methoxyphenyl diethylaminoether ether
5-allyl-2-methoxyphenyl diethylaminoethyl ether
4-allyl-2-methoxyphenyl dimethylaminoethyl ether
2-allyl-4-methoxyphenyl dimethylaminoethyl ether
5-allyl-2-methoxyphenyl dimethylaminoethyl ether
4-allyl-2-methoxyphenyl dimethylaminoethyl thioether
2-allyl-4-methoxyphenyl dimethylaminoethyl thioether
5-allyl-2-methoxyphenyl dimethylaminoethyl thioether
4-allyl-2-methoxyphenyl dipropylaminoethyl thioether
2-allyl-4-methoxyphenyl dipropylaminoethyl thioether
5-allyl-2-methoxyphenyl dipropylaminoethyl thioether
4-allyl-2-methoxyphenyl dipropylaminoethyl ether
2-allyl-4-methoxyphenyl dipropylaminoethyl ether
5-allyl-2-methoxyphenyl dipropylaminoethyl ether
4-allyl-2-methoxyphenyl diisopropylaminoethyl ether
2-allyl-4-methoxyphenyl diisopropylaminoethyl ether
5-allyl-2-methoxyphenyl diisopropylaminoethyl ether
4-allyl-2-methoxyphenyl diisopropylaminoethyl thioether
2-allyl-4-methoxyphenyl diisopropylaminoethyl thioether
5-allyl-2-methoxyphenyl diisopropylaminoethyl thioether
4-allyl-2-methoxyphenyl dibutylaminoethyl thioether
2-allyl-4-methoxyphenyl dibutylaminoethyl thioether
5-allyl-2-methoxyphenyl dibutylaminoethyl thioether
4-allyl-2-methoxyphenyl dibutylaminoethyl ether
2-allyl-4-methoxyphenyl dibutylaminoethyl ether
5-allyl-2-methoxyphenyl dibutylaminoethyl ether
4-(1-propenyl)-2-methoxyphenyl piperidinoethyl ether
2-(1-propenyl)-4-methoxyphenyl piperidinoethyl ether
5-(1-propenyl)-2-methoxyphenyl piperidinoethyl ether
4-(1-propenyl)-2-methoxyphenyl piperidinoethyl thioether
2-(1-propenyl)-4-methoxyphenyl piperidinoethyl thioether
5-(1-propenyl)-2-methoxyphenyl piperidinoethyl thioether
4-(1-propenyl)-2-methoxyphenyl piperidiiopropyl thioether
2-(1-propenyl)-4-methoxyphenyl piperidinopropyl thioether
5-(1-propenyl)-2-methoxyphenyl piperidinopropyl thioether
4-(1-propenyl)-2-methoxyphenyl piperidinopropyl ether
2-(1-propenyl)-4-methoxyphenyl piperidinopropyl ether
5-(1-propenyl)-2-methoxyphenyl piperidinopropyl ether
4-allyl-2-methoxyphenyl piperidinoethyl ether
2-allyl-4-methoxyphenyl piperidinoethyl ether
5-allyl-2-methoxyphenyl piperidinoethyl ether
4-allyl-2-methoxyphenyl piperidinoethyl thioether
2-allyl-4-methoxyphenyl piperidinoethyl thioether
5-allyl-2-methoxyphenyl piperidinoethyl thioether
4-allyl-2-methoxyphenyl piperidinopropyl thioether
2-allyl-4-methoxyphenyl piperidinopropyl thioether
5-allyl-2-methoxyphenyl piperidinopropyl thioether
4-allyl-2-methoxyphenyl piperidinopropyl ether
2-allyl-4-methoxyphenyl piperidinopropyl ether
5-allyl-2-methoxyphenyl piperidinopropyl ether
4-(1-propenyl)-2-methoxyphenyl pyrrolidinoethyl ether
2-(1-propenyl)-4-methoxyphenyl pyrrolidinoethyl ether
5-(1-propenyl)-2-methoxyphenyl pyrrolidinoethyl ether
4-(1-propneyl)-2-methoxyphenyl pyrrolidinoethyl thioether
2-(1-propenyl)-4-methoxyphenyl pyrrolidinoethyl thioether
5-(1-propenyl)-2-methoxyphenyl pyrrolidinoethyl thioether
4-(1-propenyl)-2-methoxyphenyl pyrrolidinopropyl thioether
2-(1-propenyl)-4-methoxyphenyl pyrrolidinopropyl thioether
5-(1-propenyl)-2-methoxyphenyl pyrrolidinopropyl thioether
4-(1-propenyl)-2-methoxyphenyl pyrrolidinopropyl ether
2-(1-propenyl)-4-methoxyphenyl pyrrolidinopropyl ether
5-(1-propenyl)-2-methoxyphenyl pyrrolidinopropyl ether
4-allyl-2-methoxyphenyl pyrrolidinoethyl ether
2-allyl-4-methoxyphenyl pyrrolidinoethyl ether
5-allyl-2-methoxyphenyl pyrrolidinoethyl ether
4-allyl-2-methoxyphenyl pyrrolidinoethyl thioether
2-allyl-4-methoxyphenyl pyrrolidinoethyl thioether
5-allyl-2-methoxyphenyl pyrrolidinoethyl thioether
4-allyl-2-methoxyphenyl pyrrolidinopropyl thioether
2-allyl-4-methoxyphenyl pyrrolidinopropyl thioether
5-allyl-2-methoxyphenyl pyrrolidinopropyl thioether
4-allyl-2-methoxyphenyl pyrrolidinopropyl ether
2-allyl-4-methoxyphenyl pyrrolidinopropyl ether
5-allyl-2-methoxyphenyl pyrrolidinopropyl ether
4-(1-propenyl)-2-methoxyphenyl morpholinoethyl ether
2-(1-propenyl)-4-methoxyphenyl morpholinoethyl ether
5-(1-propenyl)-2-methoxyphenyl morpholinoethyl ether
4-(1-propenyl)-2-methoxyphenyl morpholinoethyl thioether
2-(1-propenyl)-4-methoxyphenyl marpholinoethyl thioether
2-(1-propenyl)-4-methoxyphenyl morpholinoethyl thioether
4-(1-propenyl)-2-methoxyphenyl morpholinopropyl thioether
2-(1-propenyl)-4-methoxyphenyl morpholinopropyl thioether
5-(1-propenyl)-2-methoxyphenyl morpholinopropyl thioether
4-(1-propenyl)-2-methoxyphenyl morpholinopropyl ether
2-(1-propenyl)-4-methoxyphenyl morpholinopropyl ether
5-(1-propenyl)-2-methoxyphenyl morpholinopropyl ether
4-allyl-2-methoxyphenyl morpholinoethyl ether
2-allyl-4-methoxyphenyl morpholinoethyl ether
5-allyl-2-methoxyphenyl morpholinoethyl ether
4-allyl-2-methoxyphenyl morpholinoethyl thioether
2-allyl-4-methoxyphenyl morpholinoethyl thioether
5-allyl-2-methoxyphenyl morpholinoethyl thioether
4-allyl-2-methoxyphenyl morpholinopropyl thioether
2-allyl-4-methoxyphenyl morpholinopropyl thioether
5-allyl-2-methoxyphenyl morpholinopropyl thioether
4-allyl-2-methoxyphenyl morpholinopropyl ether
2-allyl-4-methoxyphenyl morpholinopropyl ether
5-allyl-2-methoxyphenyl morpholinopropyl ether Compositions containing the alkoxy phenyl groups (e.g. ethoxyphenyl, propoxyphenyl, and butoxyphenyl analogs of methoxyphenyl); and compositions where the dialkyl amines as well as secondary amines (e.g. dimethyl, dipropyl, and bubutyl analogs of diethylamino); the 1-butenyl, 2-butenyl, 1-pentenyl, and 2-pentenyl analogs of 1-propenyl and allyl; and the aminoalkyl analogs of dialkylaminoalkyl ethers and thioethers in the foregoing have also been found to possess a high degree of insect repellent activity, but are less advantageous economically than the compounds set forth above.

One aspect of the present invention provides a class of compositions comprising an insect repellent amount of a compound falling within the scope of Formula I and an inert carrier or diluent conventionally used in the art.

The amount of such compound employed in the insect repellent compositions can vary widely between about 0.1 to about 90 weight percent basis of the weight of the composition and will depend upon the intended end use. Usually, the compositions contain between about 0.1 to about 10 weight percent of one or more of the compounds hereinbefore described, and the compound is usually in intimate mixture with the carrier.

When it is desired to use the insect repellent composition directly (i.e. without further dilution), the amount of the compound used can usually vary from between about 0.1 to 5.0 weight percent. When it is desired to formulate a concentrated composition, i.e. one suitable for dilution prior to end use, the compounds will usually be present in the composition in an amount of from about 0.5 to about 90 weight percent.

From the practical standpoint, compositions containing from 0.5 to 10 weight percent of one or more of the compounds can be advantageously employed for general end use dilution. Advantageous applications of the compositions of this invention are those which apply up to about 250 mg. per square foot of surface of one or more compounds falling within the scope of Formula I.

The carrier employed can be any carrier conventionally used in insect repellent formulations with the proviso that the carrier should be inert (i.e. it should be incapable of undergoing a chemical reaction with the compound or salt thereof). The carrier should also be one that will not be harmful to the environment in which it is employed. The carrier can be any one of a variety of organic and inorganic liquid, solid, or semi-solid carriers or carrier formulations conventionally used in insect repellent products and can be a mixture of such carriers.

Examples of organic liquid carriers include liquid aliphatic hydrocarbons such as pentane, hexane, heptane, nonane, decane and their analogs, as well as liquid aromatic hydrocarbons. Examples of other liquid hydrocarbons which are widely used for economic reasons include oils produced by the distillation of coal and the distillation of various types and grades of petrochemical stocks. Petroleum oils which are especially useful and economical include kerosene oils (e.g. oils composed of hydrocarbon mixtures of lower moleculer weight and which have from 10 to 16 carbon atoms), which are obtained by fractional distillation of petroleum at between 360° F. and 510° F. and which usually have a flash point between 150° F. and 185° F.

Other petroleum oils include those generally referred to in the art as agricultural spray oils which are light and medium spray oils consisting of the middle fractions in the distillation of petroleum, and have a viscosity in the range of from 40 to 85 sec. Saybolt at 100° F. and are only slightly volatile. These oils are usually highly refined and contain only minute amounts of unsaturated compounds as measured by standard sulfonation tests. The customary sulfonation range of such oils is between 90 percent and 94 percent of unsulfonatable residue. These oils are paraffin oils and can be emulsified with water and an emulsifier and diluted to lower concentrations and used as sprays. Tall oils obtained from sulfate digestion of wood pulp, like paraffin oils, also can be employed.

In addition to the above-mentioned liquid hydrocarbons and often employed in conjunction therewith, the carrier can contain conventional emulsifying agents (e.g. a non-ionic surfactant such as an ethylene oxide condensate of octyl phenol or an anionic surfactant such as an alkali metal salt of an alkylbenzenesulfonic acid). Such emulsifiers are used to permit the composition to be dispersed in and diluted with water for end use application.

When paraffin oils are employed as carriers in the insect repellent compositions of this invention, they are usually used in conjunction with an emulsifier, the mixture being diluted with water immediately prior to the end-use application. By way of example, when a compound falling within the scope of Formula I is dissolved in paraffin oil containing an emulsifier and such composition is subsequently diluted with water to form an oil-water emulsion, the emulsion when atomized and sprayed on insect-infested areas or areas susceptible to insect infestation, is a highly effective repellent against insects that may be in the area. Other suitable paraffin oils, particularly those used with emulsions, are referred to in the art as heavy paraffin oils and usually have a viscosity greater than 85 sec. Saybolt at 100° F.

Other advantageous organic liquid carriers can include liquid terpene hydrocarbons and terpene alcohols (e.g. alpha-pinene, dipentene, terpineol, and the like). Still other liquid carriers include organic solvents such as aliphatic and aromatic alcohols, esters, aldehydes, and ketones. Aliphatic monohydric alcohols include methyl, ethyl, n-propyl, isopropyl, n-butyl, sec-butyl, and t-butyl alcohols. Suitable dihydric alcohols include glycols such as ethylene and propylene glycol and the pinacols (alcohols having the empirical formula $C_6H_{12}(OH)_2$). Suitable polyhydroxy alcohols include glycerol, arabitol, erythritol, sorbitol, and the like. Suitable cyclic alcohols include cyclo-pentyl and cyclo-hexyl alcohols.

Conventional aromatic and aliphatic esters, aldehydes and ketones can be employed and are usually used in combination with the above-mentioned alcohols. Still other liquid carriers including high-boiling petroleum products, such as mineral oil and higher alcohols (sometimes referred to as "liquid waxes"), such as cetyl alcohol, can also be employed. Additionally, conventional "stabilizers" or "synergizers" such as t-butyl sulfinyl dimethyl dithiocarbamate, can be employed in conjunction with, or as a component of, the carriers comprising the compositions of this invention.

Solid carriers which can be used in the compositions of this invention include finely divided organic and inorganic solid materials. Suitable finely divided solid inorganic carriers include siliceous minerals such as clay (e.g. bentonite, attapulgite, fuller's earth, diatomaceous earth, kaolin, mica, talc, finely divided quartz, etc.) as well as synthetically prepared siliceous materials, such as silica aerogels and precipitated and fume silicas.

Examples of finely divided solid organic materials include cellulose, sawdust, synthetic organic polymers and the like.

Examples of semi-solid carriers include petroleum jelly, lanolin and the like, and mixtures of liquid and solid carriers which provide semi-solid carrier products.

The above-described compositions can be employed per se or can be diluted with suitable liquids or solids to repel common flying and crawling insect pests, such as roaches, moths, house and stable flies, termites, flour beetles, bean beetles, weevils, ticks, chinch bugs, lice, ants, chiggers, and the like. The compositions, when used to contact an insect environment, effectively repel the insects. By way of example, one advantageous embodiment of a composition of this invention comprises from about 0.1 to about 90 percent, preferably 0.1 to about 10 percent, by weight of a compound falling within the scope of Formula I, in intimate mixture with one or more of the above-mentioned carriers.

Insect pests can be repelled by contacting the surfaces on which the insects may alight or crawl with a liquid, solid or semi-solid composition. The contact can be accomplished directly (e.g. by atomizing the composition into the air as a liquid or as a dust so that the material will fall on the desired surface). By way of example, harbors infested with cockroaches can be contacted with the compositions and insects will be effectively repelled from the treated areas.

By way of further example, insect-infested animals, such as dogs with fleas or poultry with lice, may be treated with the insect repellent compositions by contacting the fur and/or feathers and the lice and fleas contained therein, thereby ending the insect infestation. Also, granaries and silos can be treated with the compositions of this invention, prior to grain storage, to prevent beetle, weevil, and other insect infestations in the grain to be subsequently stored. Food packaging elements or containers including fiber, cardboard, or wooden shipping containers or storage bins, flour sacks, etc, can be treated with the compositions of this invention to prevent insect infestation.

The compositions of this invention are unexpectedly much less fugitive and/or more stable than standard insect repellents such as dimethyl phthalate, diethyltoluamide, and 2-hydroxyethyl-n-octyl sulfide. These novel compositions contain compounds having somewhat higher boiling points and somewhat lower vapor pressures than the standard insect repellents sold in commerce. As will be apparent from the specific examples, the compositions of this invention retain insect repellent properties for four and often up to six or more times longer than the insect repellents used as standard controls.

The following examples are intended to illustrate the invention but not to limit the scope thereof, parts and percentages being by weight unless otherwise specified.

EXAMPLE 1

Sixty (60) separate acetone solutions were prepared, each containing 1.5 weight percent of one of the following compounds:

4-(1-propenyyl)-2-methoxyphenyl diethylaminoethyl ether
2-(1-propenyl)-4-methoxyphenyl diethylaminoethyl ether
5-(1-propenyl)-2-methoxyphenyl diethylaminoethyl ether
4-allyl-2-methoxyphenyl diethylaminoethyl ether
2-allyl-4-methoxyphenyl diethylaminoethyl ether
5-allyl-2-methoxyphenyl diethylaminoethyl ether
4-(1-propenyl)-2-methoxyphenyl dimethylaminoethyl ether
2-(1-propenyl)-4-methoxyphenyl dimethylaminoethyl ether
5-(1-propenyl)-2-methoxyphenyl dimethylaminoethyl ether
4-allyl-2-methoxyphenyl dimethylaminoethyl ether
2-allyl-4-methoxyphenyl dimethylaminoethyl ether
5-allyl-2-methoxyphenyl dimethylaminoethyl ether
4-(1-propenyl)-2-methoxyphenyl dibutylaminoethyl ether
2-(1-propenyl)-4-methoxyphenyl dibutylaminoethyl ether
5-(1-propenyl)-2-methoxyphenyl dibutylaminoethyl ether
4-allyl-2-methoxyphenyl dibutylaminoethyl ether
2-allyl-4-methoxyphenyl dibutylaminoethyl ether
5-allyl-2-methoxyphenyl dibutylaminoethyl ether
4-(1-propenyl)-2-methoxyphenyl diisopropylaminoethyl ether
2-(1-propenyl)-4-methoxyphenyl diisopropylaminoethyl ether
5-(1-propenyl)-2-methoxyphenyl diisopropylaminoethyl ether
4-allyl-2-methoxyphenyl diisopropylaminoethyl ether
2-allyl-4-methoxyphenyl diisopropylaminoethyl ether
5-allyl-2-methoxyphenyl diisopropylaminoethyl ether
4-(1-propenyl)-2-methoxyphenyl piperidinoethyl ether
2-(1-propenyl)-4-methoxyphenyl piperidinoethyl ether
5-(1-propenyl)-2-methoxyphenyl piperidinoethyl ether
4-allyl-2-methoxyphenyl piperidinoethyl ether
2-allyl-4-methoxyphenyl piperidinoethyl ether
5-allyl-2-methoxyphenyl piperidinoethyl ether
4-(1-propenyl)-2-methoxyphenyl piperidinopropyl ether
2-(1-propenyl)-4-methoxyphenyl piperidinopropyl ether
5-(1-propenyl)-2-methoxyphenyl piperidinopropyl ether
4-allyl-2-methoxyphenyl piperidinopropyl ether
2-allyl-4-methoxyphenyl piperidinopropyl ether
5-allyl-2-methoxyphenyl piperidinopropyl ether
4-(1-propenyl)-2-methoxyphenyl pyrrolidinoethyl ether
2-(1-propenyl)-4-methoxyphenyl pyrrolidinoethyl ether
5-(1-propenyl)-2-methoxyphenyl pyrrolidinoethyl ether
4-allyl-2-methoxyphenyl pyrrolidinoethyl ether
2-allyl-4-methoxyphenyl pyrrolidinoethyl ether
5-allyl-2-methoxyphenyl pyrrolidinoethyl ether
4-(1-propenyl)-2-methoxyphenyl pyrrolidinopropyl ether
2-(1-propenyl)-4-methoxyphenyl pyrrolidinopropyl ether
5-(1-propenyl)-2-methoxyphenyl pyrrolidinopropyl ether
4-allyl-2-methoxyphenyl pyrrolidinopropyl ether
2-allyl-4-methoxyphenyl pyrrolidinopropyl ether
5-allyl-2-methoxyphenyl pyrrolidinopropyl ether
4-(1-propenyl)-2-methoxyphenyl morpholinoethyl ether
2-(1-propenyl)-4-methoxyphenyl morpholinoethyl ether
5-(1-propenyl)-2-methoxyphenyl morpholinoethyl ether
4-allyl-2-methoxyphenyl morpholinoethyl ether
2-allyl-4-methoxyphenyl morpholinoethyl ether
5-allyl-2-methoxyphenyl morpholinoethyl ether
4-(1-propenyl)-2-methoxyphenyl morpholinopropyl ether
2-(1-propenyl)-4-methoxyphenyl morpholinopropyl ether
5-(1-propenyl)-2-methoxyphenyl morpholinopropyl ether
4-allyl-2-methoxyphenyl morpholinopropyl ether
2-allyl-4-methoxyphenyl morpholinopropyl ether
5-allyl-2-methoxyphenyl morpholinopropyl ether Fifty-pound brown Kraft paper was cut into 12" x 12" sheets for testing. These test sheets were treated with an amount of solution to obtain a concentration of 50 mg. of the compound per square foot of paper on one surface thereof.

The treated Kraft paper was allowed to dry and then cut into six (6) inch by twelve (12) inch lengths for test purposes. The long edge of a treated and untreated paper sheet were joined with transparent tape.

Test plastic cylinders were placed over the treated-untreated papers so that the joint was coordinate with the diameter of the cylinder. Ten adult flour beetles were used to test each compound in four replicates.

Cockroach repellency was determined as follows: 2 percent solutions of the test chemicals were prepared in a petroleum distillate and applied to 3" x 5" index cards to achieve a deposit of 20 mg. compound per card. The treated cards were allowed to dry and aged for three days before testing.

The treated cards were exposed to a population of adult and juvenile male and female cockroaches. After a sufficient time, the number of roaches remaining on the cards was recorded. A single card treated with oil only was included as an untreated control. Percent repellency was calculated:

$$100 - \frac{(\text{Total number of roaches on treated area} \times 100)}{\text{Total number of roaches on untreated area}}$$

All paper sheets and cards treated with the above compositions exhibited confused flour beetle repellency of not less than 95 and usually 100 percent.

The test sheets and cards were set aside to determine the effect of aging and time on the insect repellent activity. The result are reported in Example 19.

Paper sheets and cards which were identically treated with compositions of a standard commercial repellent, 2-hydroxyethyl-n-octyl sulfide, in an amount to obtain identical concentrations of compound per square foot of paper exhibited below 90 percent repellency to cockroaches and confused flour beetles. Controls of untreated sheets and cards exhibited no repellency.

EXAMPLE 2

When the procedure of Example 1 is repeated except that the papers and cards are treated with corresponding thioether analogs in place of the ethers employed in Example 1, the repellency obtained is substantially the same as, or slightly greater than, that exhibited in Example 1. The repellency obtained by the standard repellent and the untreated controls is substantially the same as that exhibited in Example 1.

The test sheets and cards were set aside to determine the effect of aging and time of the insect repellent activity. The results are reported in Example 19.

EXAMPLE 3

Sixty (60) separate acetone solutions were prepared, containing respectively 1.5 weight percent of one of the sixty (60) compounds of Example 1. Sixty (60) separate groups of ten (10) Mexican bean beetles were placed in separate cages containing 5 lima bean plants that had been sprayed with 5 ml. of the above solutions. The solutions were sprayed into the atmosphere 12 inches above the plants in each cage. The time of the test was forty-eight (48) hours. All the treated lima bean plants exhibited a repellency rate of between 95 and 100 percent. 2-hydroxyethyl-n-octyl sulfide and fencholic acid, commercial standard repellents, exhibited less than 90 percent repellency. The Mexican bean beetles were observed to be feeding on all the untreated lima bean plants used as controls.

EXAMPLE 4

When the procedure of Example 3 is repeated except the lima bean plants are treated with corresponding thioether analogs in place of the ethers employed in Example 3, the repellency rate of Mexican bean beetles is substantially the same as, or slightly greater than, that obtained in Example 3. The repellency obtained by the standard repellents and the untreated controls is substantially the same as that exhibited in Example 3.

EXAMPLE 5

Sixty (60) separate test solutions were prepared containing respectively 16.5 weight percent of each of the sixty (60) compounds of Example 1. In order to test stable fly repellency, an amount of test solution to obtain 1.65 g. of compound per square foot was applied to cheese cloth. The cheese cloth was dried and formed into cylinders large enough to cover a human arm. The test cage was a 20" x 20" x 20", 20-mesh cage with a sleeve opening containing 100 stable flies.

An untreated nylon stocking was drawn over the arm, and the coated cylinder drawn over the nylon about midway up the forearm. The hand was protected by a cotton glove, and the arm exposed for one minute by insertion in the cage of test insects. If less than 5 bites were received in one minute, the cylinders were aged and retested daily until 5 bites were received in a single one-minute exposure.

All the compositions tested exhibited repellency to stable flies equal to the methadelphene, a conventional stable fly repellent (i.e. 13 days' protection from stable flies).

EXAMPLE 6

When the procedure of Example 5 is repeated except that the cheese cloth cylinders are treated with corresponding thioether analogs in place of the ethers employed in Example 5, the repellency rate of stable flies is substantially the same as, or slightly greater than, that exhibited in Example 5. The repellency rate of the standard is substantially the same as that exhibited in Example 5.

EXAMPLE 7

When the procedure of Example 1 is repeated using corresponding 1-butenyl- and 2-butenyl-2-methoxyphenyl dialkylaminoalkyl and N-heterocyclicalkyl ethers in place of the insect repellent 1-propenyl- and allyl-2-methoxyphenyl dialkylaminoalkyl and N-heterocyclicalkyl ethers in Example 1, the repellency obtained by these compositions, the standard repellent and the untreated controls is substantially the same as that exhibited in Example 1.

The test sheets and cards were set aside to determine the effect of aging and time on the insect repellent activity. The results are reported in Example 19.

EXAMPLE 8

When the procedure of Example 3 is repeated using corresponding 1-butenyl- and 2-butenyl-2-methoxyphenyl dialkylaminoalkyl and N-heterocyclicalkyl ethers in place of the insect repellent 1-propenyl- and allyl-2-methoxyphenyl dialkylaminoalkyl and N-heterocyclicalkyl ethers of Example 3, the repellency obtained by these compositions, the standard repellents and the untreated controls is substantially the same as that exhibited in Example 3.

EXAMPLE 9

When the procedure of Example 5 is repeated using corresponding 1-butenyl- and 2-butenyl-2-methoxyphenyl dialkylaminoalkyl and N-heterocyclic ethers in place of the insect repellent 1-propenyl- and allyl-2-methoxyphenyl dialkylaminoalkyl and N-heterocyclicalkyl ethers of Example 5, the repellency obtained by these compositions and the standard repellent is substantially the same as that exhibited in Example 5.

EXAMPLE 10

When the procedure of Example 2 is repeated using corresponding 1-butenyl- and 2-butenyl-2-methoxyphenyl dialkylaminoalkyl and N-heterocyclicalkyl thioethers in place of the insect repellent 1-propenyl- and allyl-2-methoxyphenyl dialkylaminoalkyl and N-heterocyclicalkyl thioethers in Example 2, the repellency obtained by these compositions, the standard repellent and the untreated control is substantially the same as that exhibited in Example 2.

The test sheets and cards were set aside to determine the effect of aging and time on the insect repellent activity. The results are reported in Example 19.

EXAMPLE 11

When the procedure of Example 4 is repeated using corresponding 1-butenyl- and 2-butenyl-2-methoxyphenyl dialkylaminoalkyl and N-heterocyclicalkyl thioethers in place of the insect repellent 1-propenyl- and allyl-2-methoxyphenyl dialkylaminoalkyl and N-heterocyclicalkyl thioethers of Example 4, the repellency obtained by these compositions, the standard repellents, and the untreated controls is substantially the same as that exhibited in Example 4.

EXAMPLE 12

When the procedure of Example 6 is repeated using corresponding 1-butenyl- and 2-butenyl-2-methoxyphenyl dialkylaminoalkyl and N-heterocyclicalkyl thioethers in place of the insect repellent 1-propenyl- and allyl-2-methoxyphenyl dialkylaminoalkyl and N-heterocyclicalkyl thioethers of Example 6, the repellency obtained by these compositions and the standard repellent is substantially the same as that exhibited in Example 6.

EXAMPLE 13

When the procedure of Example 1 is repeated using corresponding 1-pentenyl- and 2-pentenyl-2-methoxyphenyl dialkylaminoalkyl and N-heterocyclicalkyl ethers in place of the insect repellent 1-propenyl- and allyl-2-methoxyphenyl dialkylaminoalkyl and N-heterocyclicalkyl ethers in Example 1, the repellency obtained by these compositions, the standard repellent, and the untreated controls is substantially the same as that exhibited in Example 1.

The test sheets and cards were set aside to determine the effect of aging and time on the insect repellent activity. The results are reported in Example 19.

EXAMPLE 14

When the procedure of Example 3 is repeated using corresponding 1-pentenyl- and 2-pentenyl-2-methoxyphenyl dialkylaminoalkyl and N-heterocyclicalkyl ethers in place of the insect repellent 1-propenyl- and allyl-2-methoxyphenyl dialkylaminoalkyl and N-heterocyclicalkyl ethers in Example 3, the repellency obtained by these compositions, the standard repellents, and the untreated controls is substantially the same as that exhibited in Example 3.

EXAMPLE 15

When the procedure of Example 5 is repeated using corresponding 1-pentenyl- and 2-pentenyl-2-methoxyphenyl dialkylaminoalkyl and N-heterocyclicalkyl ethers in place of the insect repellent 1-propenyl- and allyl-2-methoxyphenyl dialkylaminoalkyl and N-heterocyclicalkyl

13 ethers in Example 5, the repellency obtained by these compositions and the standard repellent is substantially the same as that exhibited in Example 5.

EXAMPLE 16

When the procedure of Example 2 is repeated using the corresponding 1-pentenyl- and 2-pentenyl-2-methoxyphenyl dialkylaminoalkyl and N-heterocyclicalkyl thioethers in place of the insect repellent 1-propenyl- and allyl-2-methoxyphenyldialkylaminoalkyl and N-heterocyclicalkyl thioethers of Example 2, the repellency obtained by these compositions, the standard repellent, and the untreated controls is substantially the same as that exhibited in Example 2.

The test sheets and cards were set aside to determine the effect of aging and time on the insect repellent activity. The results are reported in Example 19.

EXAMPLE 17

When the procedure of Example 4 is repeated using the corresponding 1-pentenyl- and 2-pentenyl-2-methoxyphenyl dialkylaminoalkyl and N-heterocyclicalkyl thioethers in place of the insect repellent 1-propenyl- and allyl-2-methoxyphenyl, dialkylaminoalkyl and N-heterocyclicalkyl thioethers of Example 4, the repellency obtained by these compositions, the standard repellents, and the untreated controls is substantially the same as that exhibited in Example 4.

EXAMPLE 18

When the procedure of Example 6 is repeated using the corresponding 1-pentenyl- and 2-pentenyl-2-methoxyphenyl dialkylaminoalkyl and N-heterocyclicalkyl thioethers in place of the insect repellent 1-propenyl- and allyl-2-methoxyphenyl dialkylaminoalkyl and N-heterocyclicalkyl thioethers of Example 6, the repellency obtained by these compositions and the standard repellent is substantially the same as that exhibited in Example 6.

EXAMPLE 19

The test sheets and cards of Examples 1, 2, 7, 10, 13, and 16 were evaluated for insect repellency at the aging intervals listed below. The test sheets and cards were aged for three (3) days, six (6) days, eight (8) days, and seventeen (17) days prior to re-exposure to cockroaches and confused flour beetles using the test procedures of Example 1. After being aged three days, the sheets and cards treated with the compositions exhibited between 96 and 100 percent repellency. The sheets and cards treated with 2-hydroxyethyl-n-octyl sulfide (a conventional repellent) exhibited no repellency. After six days' aging, sheets and cards treated with the compositions of the above-listed examples, exhibited between 75 and 98 percent repellency. Sheets and cards treated with the standard exhibited no repellent activity. After eight days' aging, sheets and cards treated with the compositions of these Examples exhibited between 58 and 84 percent repellency. After aging for seventeen (17) days, sheets and cards treated with the compositions of these examples retained more than 10 percent repellent activity.

The compounds described in the compositions set forth in the foregoing examples may be readily converted, when desirable, into water-soluble salts, thus often eliminating the need for emulsifiers. Such compounds are made water soluble without substantially altering their insect repellent activity by treatment with an appropriate acid, such as, for example, hydrochloric, hydrobromic, sulfuric, and phosphoric acids to form the corresponding hydrochloride, hydrobromide, acid sulphate, and acid phosphate salts. These stable salts are effectively soluble in water and can be applied to surfaces and areas which are susceptible to insect attack or infestation to effectively repel insects from such areas.

What is claimed is:

1. A process for repelling insects in an environment infested with insects which comprises contacting said insect environment with an insect repelling amount of a compound of the formula:

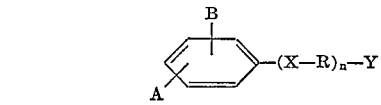

where A is ethylenically unsaturated hydrocarbon containing from 3 to 5 carbon atoms,
X is sulfur or oxygen,
R is lower alkylene containing from 1 to 6 carbon atoms,
B is lower alkyl thio or alkoxy containing from 1 to 4 carbon atoms,
Y is selected from the group consisting of N-heterocyclic and

wherein R' and R" are like or dissimilar lower saturated alkyl having one to four carbon atoms; and
n is an integer from 1 to 3; or stable salts thereof in admixture with an inert carrier for said compound.

2. The process of claim 1 where said compound is present in said mixture in an amount from about 0.1 to about 90 weight percent basis the weight of the mixture.

3. The process of claim 2 where, in said compound, n is 1, X is oxygen, R is ethylene or propylene, and Y is

where R' and R" are like or dissimilar saturated lower alkyl.

4. The process of claim 2 where in said compound R' and R" are ethyl, and A and B are in the 4 and 2 positions or in the 2 and 4 positions, respectively.

5. The process of claim 3 where, in said compound, A is allyl.

6. The process of claim 5 where, in said compound, R is ethylene.

7. The process of claim 6 where said compound is 4-allyl-2-methoxyphenyl-diethylaminoethyl ether.

References Cited
UNITED STATES PATENTS

| | | | |
|---|---|---|---|
| 1,787,519 | 1/1931 | Hahl | 260—570.7 |
| 3,095,449 | 6/1963 | Wirth et al. | 424—330 X |
| 3,142,554 | 7/1964 | Godfrey | 260—570.7 X |

OTHER REFERENCES

Takahashi et al.: Chem. Abs., 1952, vol. 46, pp. 455.
Hankovszky et al.: Chem. Abs., 1966, vol. 64, pp. 19608.
Kuroda et al.: Chem. Abs., 1951, vol. 45, pp. 3349–3352.

ALBERT T. MEYERS, Primary Examiner
D. W. ROBINSON, Assistant Examiner

U.S. Cl. X.R.
424—248, 267, 274; 260—570.7